April 12, 1966     W. T. CLARK     3,245,178
OBSERVATORY
Filed June 28, 1962     6 Sheets-Sheet 1

William T. Clark
INVENTOR.

William T. Clark INVENTOR.

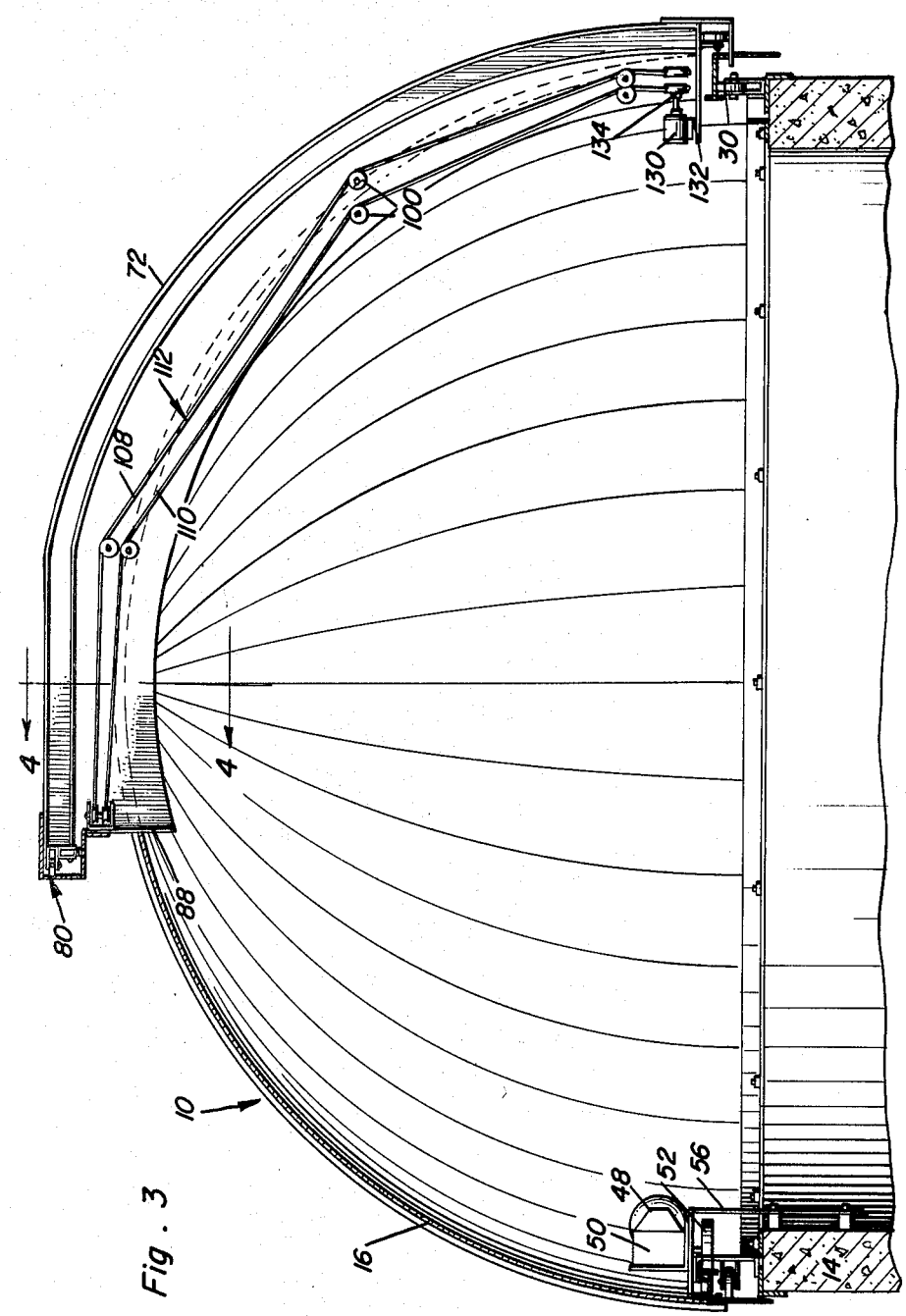

April 12, 1966  W. T. CLARK  3,245,178
OBSERVATORY
Filed June 28, 1962  6 Sheets-Sheet 4
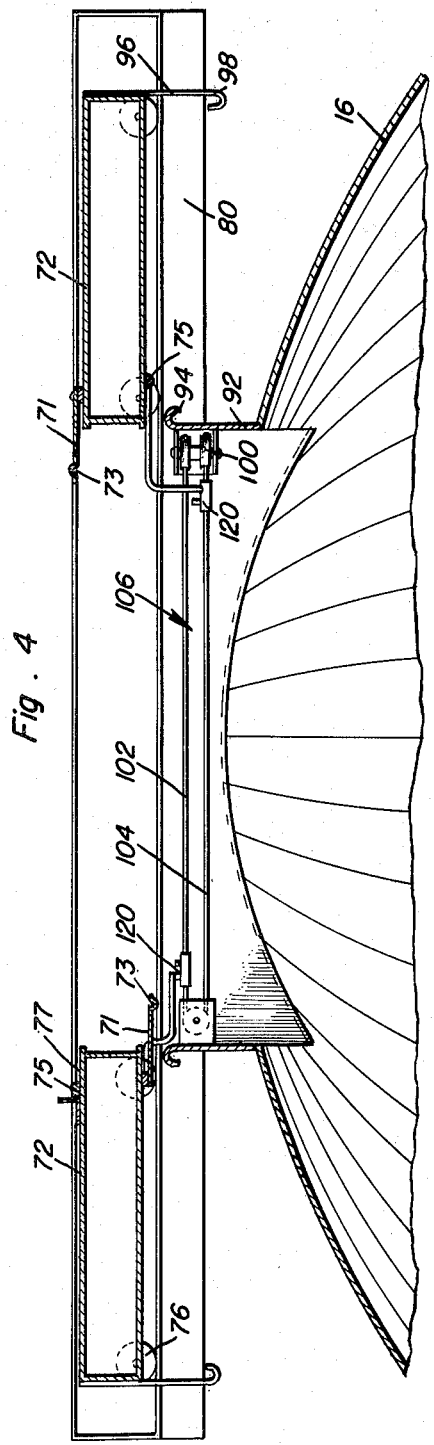
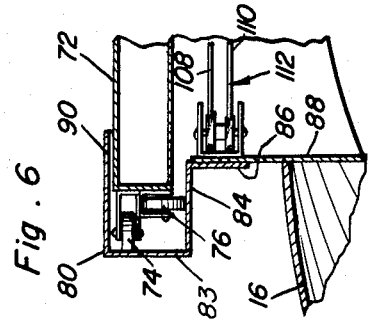
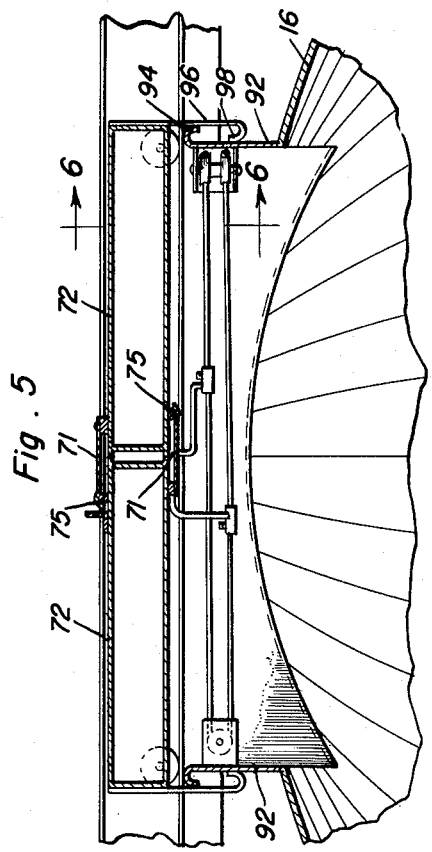
William T. Clark
INVENTOR.

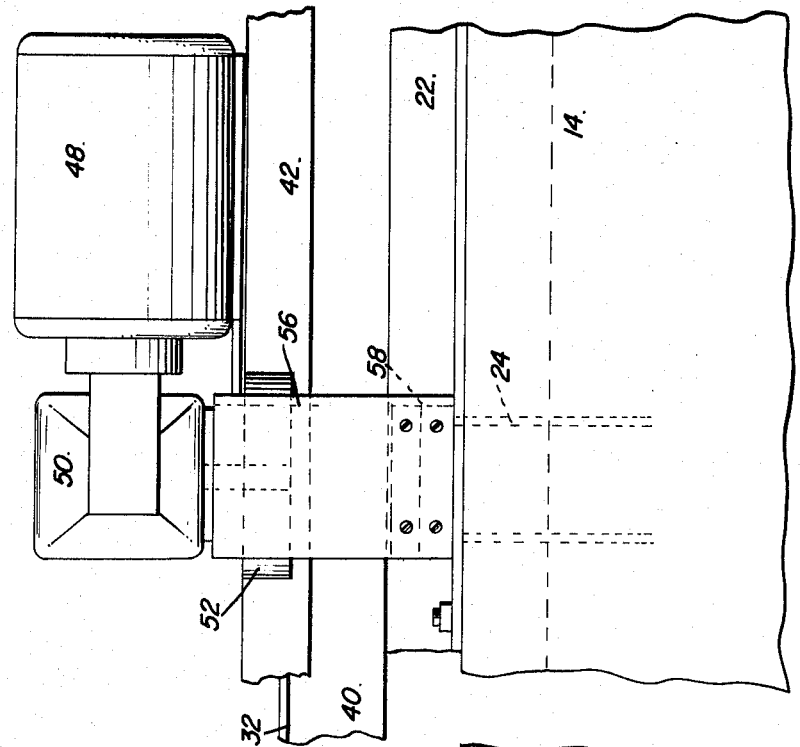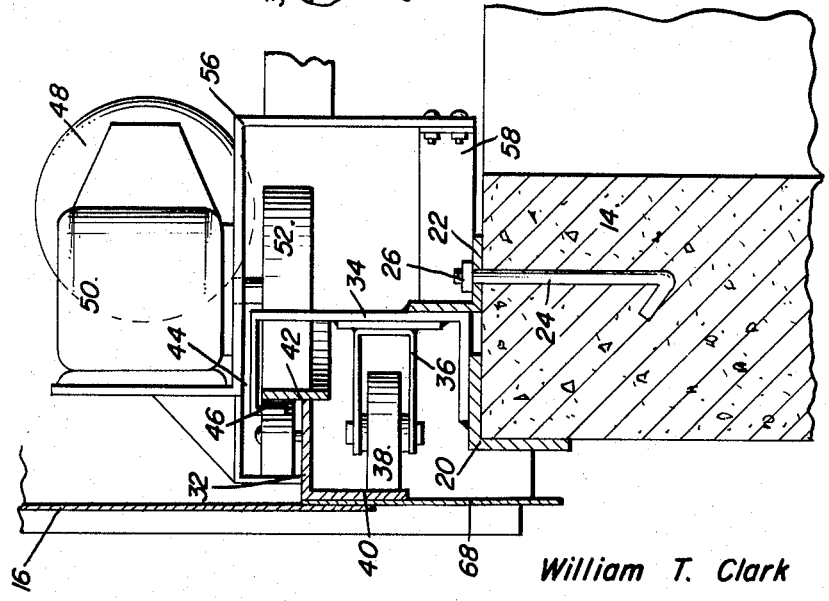

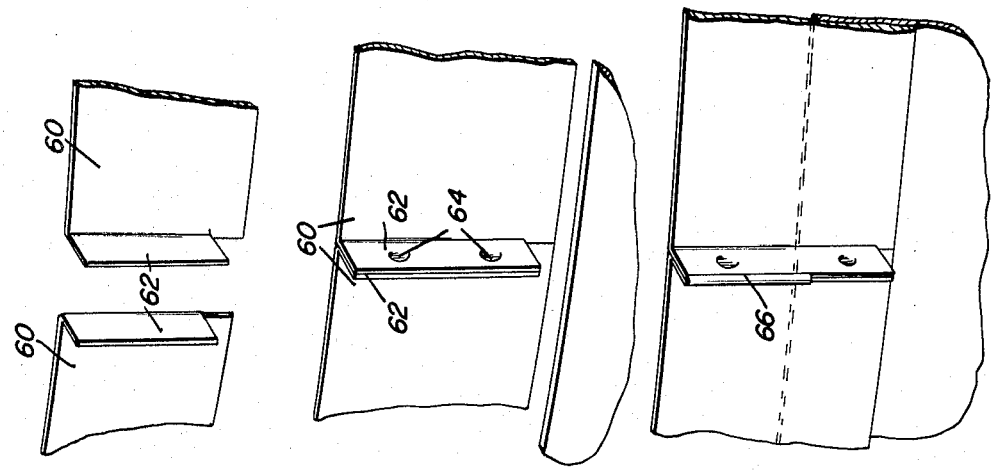
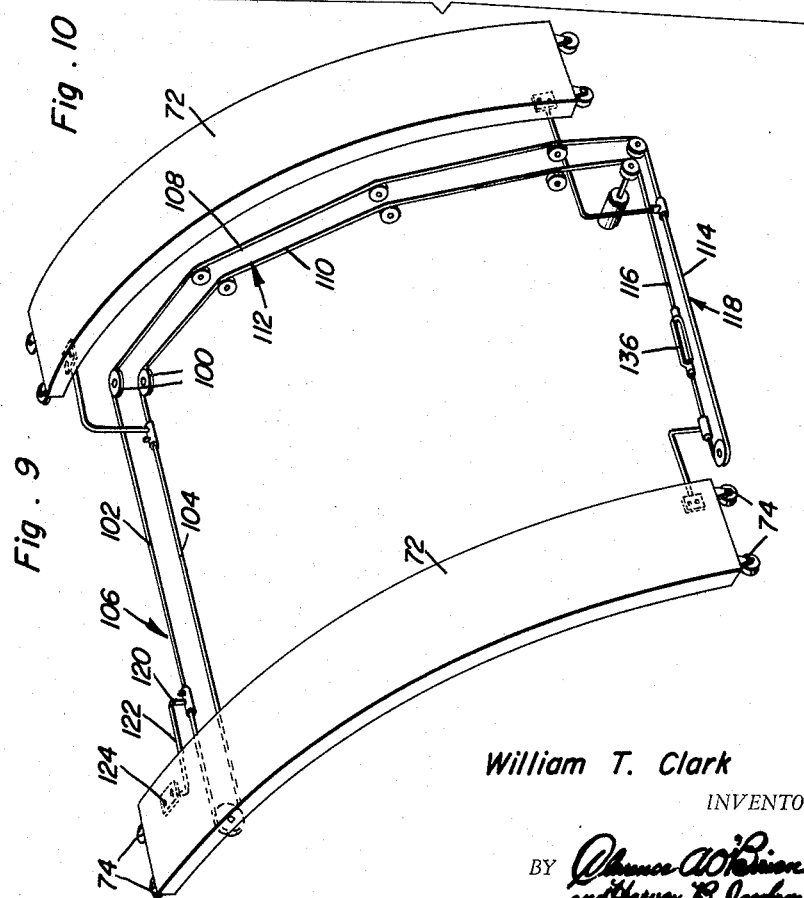

United States Patent Office 3,245,178
Patented Apr. 12, 1966

1

3,245,178
OBSERVATORY
William T. Clark, Jackson, Miss., assignor to Clark-Burt Roofing Co., Inc., Jackson, Miss., a corporation of Mississippi
Filed June 28, 1962, Ser. No. 205,900
7 Claims. (Cl. 52—65)

This invention comprises a novel and useful observatory and more particularly pertains to an astronomical observatory of the rotatable dome type incorporating improved and advantageous features therein.

The primary object of this invention is to provide an astronomical observatory construction which shall be of light weight and of minimum cost and ideally adapted for housing medium and low powered astronomical telescopes in relatively inexpensive installations.

A further object of the invention is to provide an astronomical observatory incorporating therein a novel and improved construction of observatory dome together with an improved means for rotatably journalling the latter.

A further object of the invention is to provide an observatory construction in accordance with the foregoing objects which shall incorporate therein an improved sight opening in the dome construction together with a shutter assembly therefor.

Still another object of the invention is to provide a shutter assembly for observatory domes which shall be extremely weather-proof, shall incorporate a water drainage means in its construction for preventing the ingress of water into the dome and which shall have an improved operating mechanism for effecting opening and closing movement of the shutters.

Still another purpose of the invention is to provide an observatory dome in accordance with the preceding objects which shall provide improved means for supporting the dome for rotation, means for guiding the dome during its rotation, together with means for effectively securing the dome to its supporting and guiding means and to its base support.

A further object of the invention is to provide an observatory rotatable dome in accordance with the aforementioned objects in which greatly increased ease and smoothness of rotation of the dome is secured through the use of a friction drive roller conveniently mounted within the dome.

Yet another purpose of the invention is to provide a novel method and means of fabricating a rigid one-piece observatory dome of hemispherical shape and of sheet metal construction and yet which will have the requisite rigidity together with a lightness of weight.

A still further important object of the invention is to provide a lightweight compact observatory dome construction in which the interior of the dome shall be devoid of reinforcing structural elements and wherein the necessary rigidity is given to the dome by the ribs formed by the joints of the spherical segments of the dome skin and by the shutter frame construction upon the exterior of the dome.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

2

Figure 2:
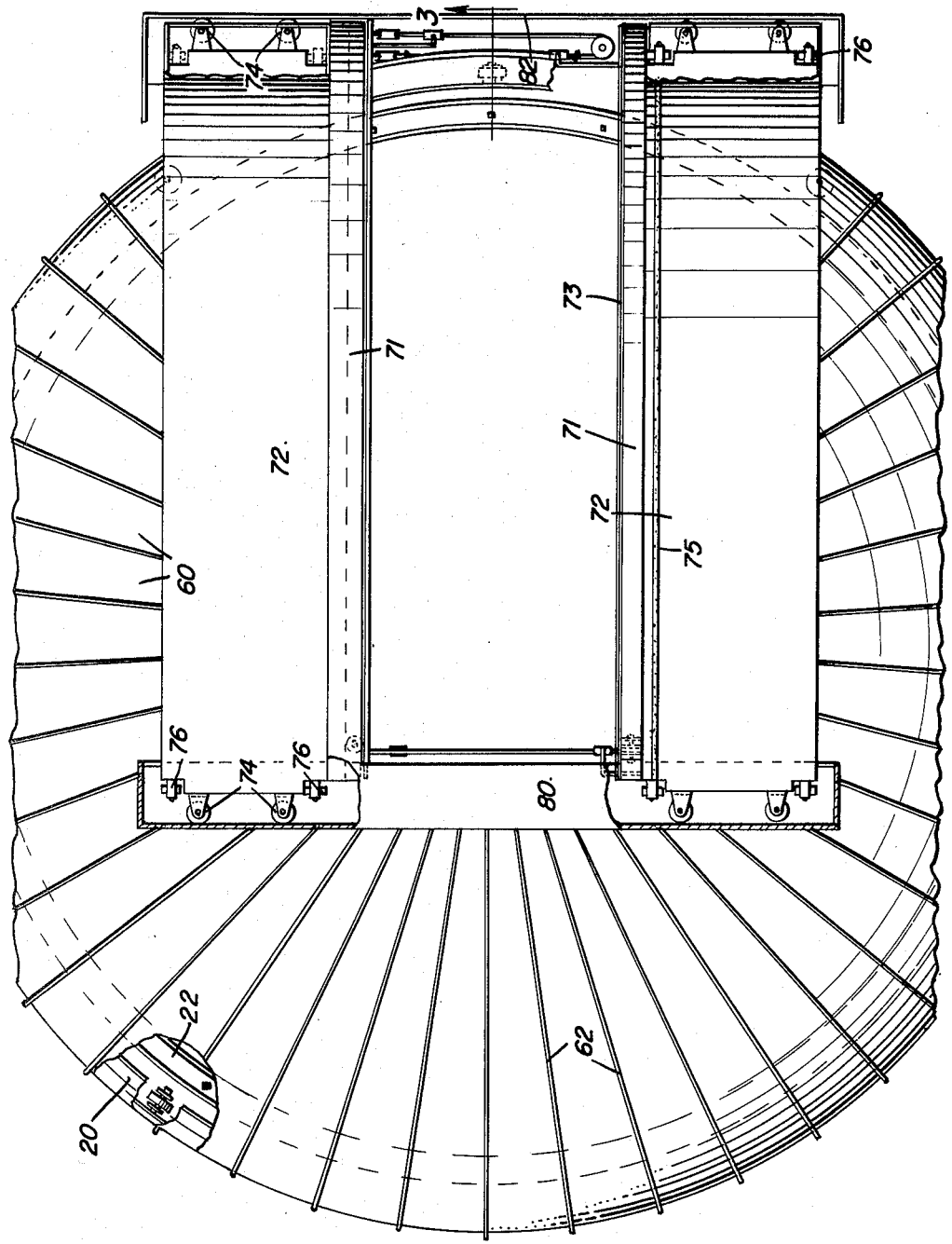
FIGURE 2 is an enlarged top plan view of the dome construction of FIGURE 1, parts being broken away to show further details thereof.

FIGURE 3 is a vertical transverse sectional view taken upon an enlarged scale substantially upon a plane indicated by section line 3—3 of FIGURE 2 and showing in particular the interior of the dome, its mounting and driving means and some of the shutter operating mechanism of the device;

FIGURE 4 is a detail view taken upon an enlarged scale in vertical section substantially upon a plane indicated by section line 4—4 of FIGURE 3 and showing further details of the upper portion of the shutter support frame and operating means with the parts being in the open position of the shutter;

FIGURE 5 is a view similar to FIGURE 4 but showing the parts in their closed position;

FIGURE 6 is a detail view of the shutter upper support and operating means taken in vertical section substantially upon the plane indicated by section line 6—6 of FIGURE 5;

FIGURE 7 is an enlarged detail view in vertical transverse section showing a lower portion of the dome and in particular indicating the centering of the dome together with the means for imparting rotation thereto;

FIGURE 8 is a detail view similar to FIGURE 7 but taken at right angles thereto and from the right side of FIGURE 7;

FIGURE 9 is a perspective view, somewhat schematic, of the shutter assembly and its operating mechanism;

FIGURE 10 is a group assembly view showing in perspective detail the method of forming the hemispherical dome from the segmental components thereof;

FIGURE 11 is a further detail view in vertical section of the support roller assembly for rotatably mounting the dome;

FIGURE 12 is a detail view with parts broken away and taken in vertical section substantially upon the plane indicated by section line 12—12 of FIGURE 11.

Figure 1:
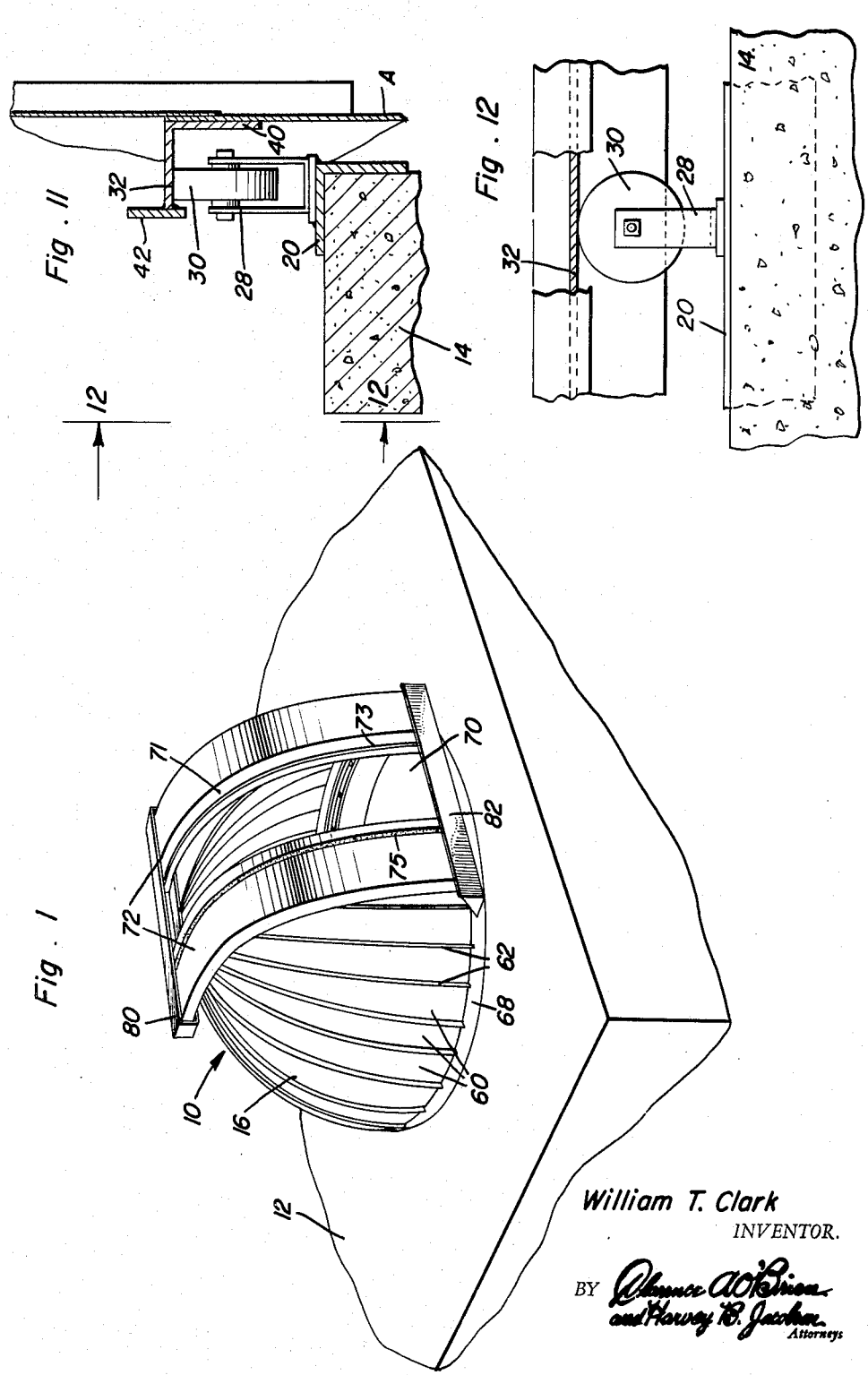
FIGURE 1 is a perspective view showing a typical observatory dome construction in accordance with the principles of this invention and with the shutters being shown in their open position.

Indicated generally by the numeral 10 in FIGURE 1 is a preferred embodiment of a rotatable observatory dome in accordance with this invention which as shown is mounted upon a suitable supporting structure as that indicated at 12. This support may be of the roof of a building, or a suitable supporting platform in the yard or the like. As shown in the accompanying drawings, the observatory dome construction includes a hemispherical dome which is rotatably mounted upon a generally horizontal support for rotation preferably throughout 360 degrees about a generally vertical axis.

Referring next to FIGURE 3 in particular, it will be seen that there is provided an upstanding preferably annular foundation or wall 14 upon which is rotatably mounted the hemispherical body 16 which comprises the observatory dome.

As will be apparent from FIGURE 3 considered in connection with FIGURE 7, the top surface of the foundation support 14 is preferably provided with an annulus or ring 20 which may be L-shaped in cross-section. Spaced radially inwardly from the ring 20 is a second and preferably smaller annulus or ring 22 likewise of L-shaped configuration and which is preferably secured to the footing or foundation 14 as by bolts 24 embedded in the footing and provided with nuts 26 by which the ring is detachably secured to the footing. The ring 22 may be of spaced sections, if desired.

As will be best apparent from a consideration of FIGURES 11 and 12, a plurality of upwardly projecting brackets 28 are welded or otherwise secured to the ring 20 and comprise journal brackets upon which are revolubly mounted a plurality of support rollers 30 which project upwardly therefrom. These support rollers engage the underside of an annular track 32 preferably likewise in the form of an L-shaped member and which is secured to the inside of the lower portion of the hemispherical dome body 16. In this manner, at a plurality of points spaced circumferentially thereof, the dome is supported at its lower or equatorial portion upon the support rollers 30 of the footing or support structure 14.

It will also be observed from FIGURE 7 that a plurality of upstanding brackets 34 are welded or otherwise fixedly secured to the rings 20 and 22 to project upwardly therefrom. Secured to these brackets 34 are other sets of bifurcated brackets 36 each of which carries a guide roller 38 which is adapted to engage a vertical cylindrical flange 40 of the annular track member 32 previously mentioned. The rollers 38 by their engagement with the inside surface of the dome at the flange 40 serve to center and retain the dome in centered position wtih respect to the support rollers and the foundation or base. In order to prevent upward displacement of the dome from its supporting and guiding rollers, as during a windstorm or the like, a retaining or holddown means is provided. For this purpose, with continuing reference to FIGURES 7 and 8, it will be seen that the annular track 32 is provided with a cylindrical vertical flange 42 at its inner periphery which projects vertically upwardly therefrom. The bracket means 34, or some other bracket if desired, is provided with an overhanging laterally projecting arm 44 with a depending flange 46 which overlies the flange 42 and thus although permitting free rotation of the dome upon the supporting and guiding rollers, prevents upward displacement of the dome therefrom.

The cylindrical flange 42 is also used as a means to impart rotation to the dome. For this purpose, an electric motor such as that shown at 48 in FIGURES 7 and 8 and which is provided with a reduction gear drive 50 of any suitable character imparts rotation to a friction drive roller 52 which latter may consist of a suitable non-metallic material of a cushioning nature and having a high coefficient of friction such as rubber or the like. This friction roller is engaged with the flange 42 and thus serves to impart rotation thereto. Thus a relatively slow movement of the dome in its rotation may be effected without jarring and with infinitesimal movement under any conventional control system provided for this purpose.

It will be observed that any suitable support is provided for the drive motor. Thus, the motor and its reduction gearing assembly can be mounted upon a suitable support stand or bracket assembly as at 56 and which in turn is carried by brackets 58 mounted upon the footing 14.

As previously mentioned, the hemispherical body 16 which comprises the rotatable observatory dome is of a unitary sheet metal construction. In the interest of lightness of weight, economy and ease of assembly, it is preferred to form the hemispherical body of a series of sheet metal spherical segments or sections each indicated by the numeral 60. As will be seen particularly in FIGURE 10, the sections 60 upon their marginal edges are provided with perpendicular upturned marginal flanges 62 which thus project exteriorly of the surface of the dome. In fabricating the dome, the appropriately shaped segments are successively placed in side-by-side abutting engagement and permanently bonded together. Thus, as shown in the second view in FIGURE 10, the two adjacent sections are placed with their adjacent flanges 62 in face-to-face side-by-side engagement and in any suitable manner are compressively clamped together unitl spot welding or tacking in the form of dimples as at 64 are produced at suitably spaced intervals along the marginal length of the flanges. Thus, the flanges are temporarily held in position. Thereupon, a continuous weld is formed upon the flush juxtaposed outer edges of these flanges as shown partially completed in the lower portion of FIGURE 10 and the material of the flanges is thus fused along the edge to form a welded bond or seam as at 66. It will be appreciated that this seam extends the full length of the flanges from the apex of the dome to the equatorial section thereof.

These flanges which project outwardly on the exterior of the dome serve not only as a convenient means for assembling the segments of the dome into a unitary assembly, but also serve the purpose of imparting great stiffness and strength to the thin sheet material of the dome.

At their lower edges, the spherical segments or sections 60 have welded to their inside surface in such a manner as to depend therebeneath a cylindrical apron or skirt 68, see also FIGURE 7, and it is to this skirt and the thus thickened lower portion of the equatorial section of the dome that the previously mentioned annular track 32 is welded or otherwise secured.

As will be noted, this skirt extends below the upper portion of the foundation 14 to provide a drip shield therefor to prevent the ingress of moisture and thus protect the supporting and centering rollers and the driving means from the effects of weather and the like.

It will be noted that the observatory dome has a vertically extending opening 70 therein comprising a sight opening and which extends from a position which is closely adjacent to the apex to the vicinity of the equatorial portion of the dome. This opening is provided for the usual purpose of fitting a telescope to be sighted therethrough for observation purposes. A shutter assembly, see FIGURE 9, is provided to releasably cover or close this opening. For this purpose the shutter assembly includes a pair of identical shutters each indicated by the numeral 72. The upper and lower ends of the shutters are provided with guide rollers 74 which are adapted to ride in tracks of guideways, the weight of the shutters being supported by further rollers 76. The roller arrangement as shown in FIGURE 6. A shutter frame assembly is secured to and extends transversely across the dome at the upper and lower ends of the sight opening 70. This frame assembly includes upper and lower transverse frame members 80 and 82 respectively. The member 80 as shown particularly in FIGURE 6 includes a channel-shaped portion having a vertical end wall 83 against which the guide rollers 74 bear and a horizontal wall portion 84 upon which the support roller 76 rides. The channel member includes the vertically extending mounting plate 86 which is fastened to a plate 88 which is secured to the dome along the margin of the sight opening. The channel member 80 further includes a horizontal top wall 90 which overhangs the adjacent edges of the shutters 72 and thus form a weather seal therewith to prevent the ingress of moisture.

The lower frame cross member 82 is of similar construction to that described with respect to the member 80.

A weather sealing means is provided for the shutter panels and the shutter frame assembly. Thus, referring particularly to FIGURES 4 and 5 it will be observed that the upstanding side plates 92 which are secured to the inside edges of the sight opening 70 are provided at their upper ends with outwardly turned flanges 94 comprising downwardly opening channels. The side edges of the shutters 72 at their outer ends are provided with depending sealing strips 96 which at the lower ends are provided with inturned flanges 98 underlying the flanges 94. Thus, when the shutter panels are closed as shown in FIGURE 5, there is provided a drain trough upon the exterior of the plates 92 which collects any precipitation passing beneath the panels and discharges it at the lower end of the troughs thus formed into the lower cross member 82 and from thence to the exterior of the dome in a suitable manner. In addition to the outer sealing means there is provided a seal at the adjacent or inner edges of the shutters. Each shutter has a laterally projecting plate 71 provided with a sealing channel 73 cooperating with a complementary rib 75 on the cooperating surface 77 of the adjacent shutter.

Operating means are provided to effect simultaneous opening and closing of the shutter panels. For this purpose a pulley and endless cable assembly together with a power operating means is found to be quite satisfactory. Referring now especially to FIGURES 3-5 and 9 it will be observed that this operating assembly includes a plurality of appropriately positioned end journalled pulleys 100 about which is entrained an endless cable. This cable is disposed in a generally U-shaped configuration with upper and lower flights or reaches 102 and 104 respectively at its upper horizontally extending portion which is indicated generally by the numeral 106, corresponding upper and lower reaches 108 and 110 for its vertical or intermediate portion 112, and parallel reaches 114 and 116 for its horizontal lower portion 118. The upper reach 102 of the upper portion 106 has a connector clamp 120 of any suitable character fixedly secured thereto carrying an actuating arm 122 which is attached by a swivel plate 124 to the upper end of the underside of one of the shutter panels. The other reach 104 of the upper portion 106 is similarly connected to the other of the panels. In a corresponding manner, the reaches 114 and 116 of the lower portion 118 are likewise connected to the lower ends of the two panels. As will be seen from FIGURE 9, the arrangement is such that when the cable is caused to turn on its pulleys in one direction, simultaneous sliding movement of the two panels toward or from each other will be effected by virtue of their connection to the corresponding reaches of the endless cable.

In order to impart the desired movement to the cable, a source of power such as an electric motor 130, see FIGURE 3, mounted upon any suitable support such as a stand or bracket 132 within the dome is connected to one of the pulleys such as the driving pulley 134. Suitable electric controls, not shown, limit switches and the like are provided so that the reversible motor may be utilized to effect opening or closing movement of the shutters as desired.

Inasmuch as the details of the motor controls are of any conventional design and in themselves form no part of the invention set forth and claimed herein, a further description is deemed to be unnecessary.

It will be observed that a turnbuckle or other similar arrangement shown at 136 in FIGURE 9 is utilized to effect the desired tension for the endless cable.

It will now be apparent that the observatory dome of this invention provides a substantially weather tight seal for the observatory. However, as will be apparent from an inspection of the detail views of FIGURES 3, 5 and 7, there is sufficient clearance at various portions of the construction to permit the circulation of air into and out of the dome for ventilation and other purposes. If desired, a fan or other forced ventilating means could be provided if desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. A rotatable observatory dome construction comprising a supporting base and a downwardly opening hemispherical dome of lightweight sheet material and completely devoid of internal bracing and supports and rotatably mounted upon said base and enclosing the upper end of the latter, and annular track mounted on said dome within the lower portion thereof, said annular track being of L-shaped cross-section having vertically and horizontally extending flanges, said vertical flange having its outer face engaging and secured to said dome, vertically extending support rollers and horizontally projecting guide rollers each carried by and disposed above said base and engaging said annular track and respectively supporting and centering said dome for rotation about a vertical axis, said vertical flange having its inner face engaged by said guide rollers and said horizontal flange having its lower face engaged by said support rollers, holddown means mounted on said base and having horizontally projecting means overlying said annular track and preventing disengagement of the latter from said support and guide rollers, said holddown means and said support and guide rollers being housed within said dome lower portion.

2. The combination of claim 1 including a cylindrical flange secured to the inner edge of said horizontal flange and projecting upwardly above the latter, said holddown horizontally projecting means overlying and cooperating with the upper edge of said cylindrical flange to prevent upward displacement of said dome.

3. The combination of claim 2 including drive means imparting rotation to said dome and including a friction drive roller engaging said cylindrical flange.

4. The combination of claim 3 wherein said drive means is carried by a bracket assembly mounted upon said base and is surrounded by said cylindrical flange.

5. A rotatable observatory dome construction comprising a supporting base and a downwardly opening hemispherical dome of lightweight sheet material and completely devoid of internal bracing and supports and rotatably mounted upon said base and enclosing the upper end of the latter, an annular track mounted on said dome within the lower portion thereof, support rollers and guide rollers each carried by and disposed above said base and engaging said annular track and respectively supporting and centering said dome for rotation about a vertical axis, said dome having a sight opening extending from its apex to its lower edge, a shutter assembly mounted upon the exterior of said dome and removably covering said sight opening, means for actuating said shutter assembly to closing and opening positions, a mounting frame secured to the exterior of said dome and including upper and lower transversely extending frame members, said shutter assembly comprising a pair of shutters disposed in side-by-side relation and movable toward and from each other, support rollers and guide rollers both mounted on the upper and lower ends of said shutters and movably confined in said upper and lower transverse frame members, each of said transverse frame members being channel-shaped with said support and guide rollers engaging the bottom and a side wall thereof, with the other side wall thereof overlying and slidably retaining the adjacent edges of said shutters, said shutters having adjacent vertical edges with weather sealing plates carried thereby and projecting beyond said shutters into an overlapping engagement, each of said plates and the opposite shutter having a cooperating sealing rib and grooves, said sealing plates being mounted upon the opposite faces of said shutter and providing both interior and exterior weather seals therefor, the outer vertical edges of said shutters and the outer vertical edges of said mounting frame have cooperating troughs engageable in the shutters' closed position to constitute drain troughs.

6. A rotatable observatory dome construction comprising a supporting base and a downwardly opening hemispherical dome of lightweight sheet material and completely devoid of internal bracing and supports and rotatably mounted upon said base and enclosing the upper end of the latter, an annular track mounted on said dome within the lower portion thereof, support rollers and guide rollers each carried by and disposed above said base and engaging said annular track and respectively supporting and centering said dome for rotation about a vertical axis, said dome having a sight opening extending from its apex to its lower edge, a shutter assembly mounted upon the exterior of said dome and removably covering said sight opening, means for actuating said shutter assembly to closing and opening positions, a mounting frame secured to the exterior of said dome and including upper and lower transversely extending frame members, said shutter assembly comprising a pair of shutters disposed in side-by-side relation and movable toward and from each other, support rollers and guide rollers both mounted on the upper and lower ends of said shutters and movably confined in said upper and lower transverse frame members, operating means for said shutters mounted upon the exterior of said dome and within said mounting frame, said operating means comprising pulleys rotatably mounted upon said mounting frame upon said upper and lower transverse frame members and upon one side of said mounting frame, an endless cable entrained over said pulleys in a U-shaped configuration, connections attaching the upper and lower ends of each shutter to said cable for simultaneous movement of said shutters towards and from each other upon movement of said cables, means for actuating said cable.

7. The combination of claim 6 wherein said actuating means comprises a motor having a pulley over which said cable is trained, said motor being mounted upon a transverse frame member.

References Cited by the Examiner

UNITED STATES PATENTS

| | | | |
|---|---|---|---|
| 416,364 | 12/1889 | Hough et al. | 50—52 |
| 503,361 | 8/1893 | DeVry | 268—48 |
| 1,658,640 | 2/1928 | Huberty | 268—49 X |
| 2,065,043 | 12/1936 | Bonsal | 50—38 |
| 2,173,402 | 9/1939 | Thompson | 50—38 |
| 2,846,962 | 8/1958 | Morgan | 50—52 X |
| 2,996,844 | 8/1961 | Paulson | 50—52 |
| 3,037,275 | 6/1962 | Schmitz | 29—471.1 |
| 3,052,021 | 9/1962 | Needham | 29—471.1 |

OTHER REFERENCES

Scientific American: July 1931, pages 30–32.
Construction Methods: October 1934, pages 38 and 39.

CHARLES E. O'CONNELL, *Primary Examiner.*

JACOB SHAPIRO, EARL J. WITMER, *Examiners.*